United States Statutory Invention Registration [19]

[11] Reg. Number: H959

Heckman et al. [43] Published: Sep. 3, 1991

[54] PROJECTILE TERMINAL DELIVERY VEHICLE ASSEMBLY

[75] Inventors: John E. Heckman, Shell Rock; Joseph P. Van Dorn, Waterloo, both of Iowa

[73] Assignee: The United States of America as represented by the Secretary of the Navy, Washington, D.C.

[21] Appl. No.: 657,595

[22] Filed: Feb. 19, 1991

[51] Int. Cl.[5] ..... F42B 12/58

[52] U.S. Cl. ..... 102/489; 102/357

*Primary Examiner*—Harold J. Tudor

*Attorney, Agent, or Firm*—Anthony T. Lane; Edward Goldberg; Michael Sachs

[57] ABSTRACT

A projectile and sub-projectile assembly including a centering tube positionable within a chamber of the projectile to retain the sub-projectile positioned in the projectile. An expandable locking ring is positionable within the projectile through an opening in the rear of the projectile and engageable with a groove. A tube flange cooperates with the tube and the locking ring to maintain the locking ring within the groove and to fix the tube in a centered position substantially coaxial with the projectile. An expulsion piston arrangement is provided including sub-projectile engagement surfaces and sealing elements to seal the chamber from an expulsion charge chamber having an expulsion charge. Upon ignition of the expulsion charge, hot gases act on the piston which acts on the sub-projectile to disengage a base plug from the projectile to allow expulsion of the sub-projectile.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 2a
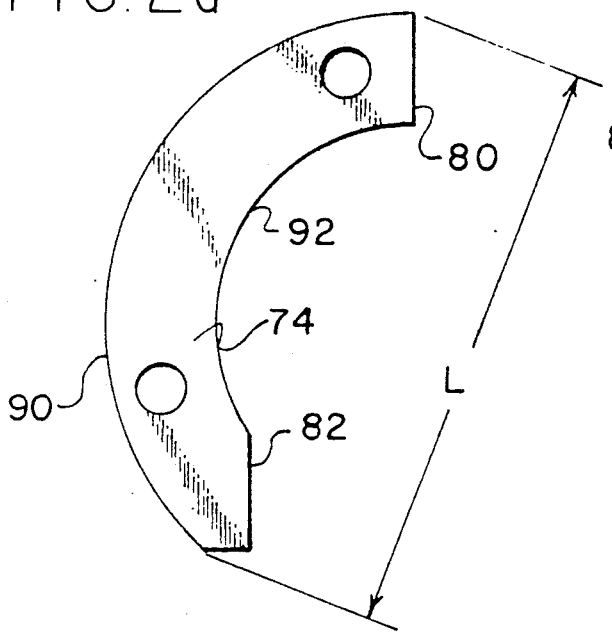
FIG. 2b
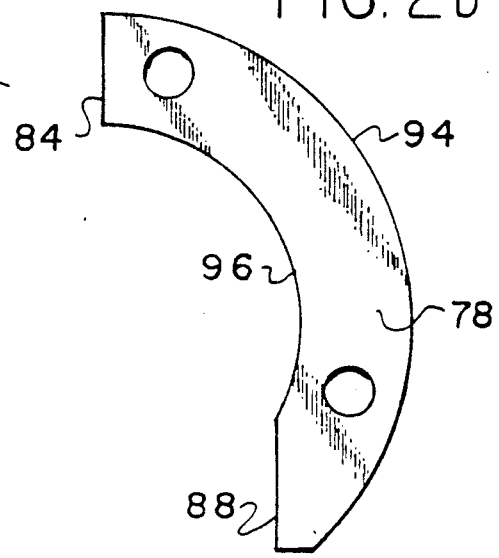
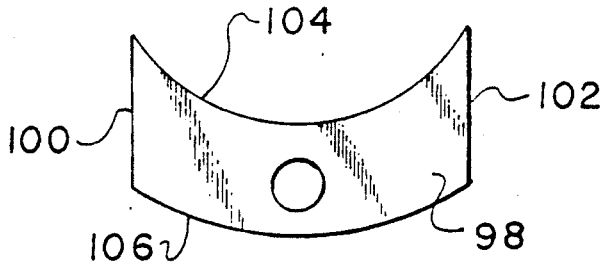
FIG. 2c

PROJECTILE TERMINAL DELIVERY VEHICLE ASSEMBLY

GOVERNMENTAL INTEREST

The invention described herein was made in the course of or under a contract or subcontract thereunder with the Government and may be manufactured, used and licensed by or for the Government for Governmental purposes without the payment to me/us of any royalties thereon.

FIELD AND BACKGROUND OF THE INVENTION

The present invention relates to a projectile and terminal delivery vehicle assembly for maintaining a sub-projectile in a secure position at the time of loading and firing and allowing dependable and smooth ejection of the sub-projectile from the projectile.

Arrangements which include a main projectile and a sub-projectile, carried by the main projectile until it is ejected, often encounter problems relating to both properly securing the sub-projectile as it is carried by the projectile and also guaranteeing that the sub-projectile is properly ejected in a smooth manner at the time desired. Such sub-projectiles often include large diameter finned portions and a portion with a smaller diameter than the interior diameter of the projectile. Accordingly, such a sub-projectile will often move around relative to the projectile both during loading, firing and during flight. The folding finned arrangement should ideally be protected from hitting the interior of the projectile. Additionally, the smaller diameter upper portion of the sub-projectile should be protected such that the cargo, such as delicate communications equipment and the like, is not damaged. However, past arrangements which retain the sub-projectile relative to the projectile will necessarily hamper the ejection of the sub-projectile from the projectile.

SUMMARY AND OBJECTS OF THE INVENTION

It is an object of the invention to provide a projectile, subprojectile arrangement which maintains the sub-projectile in a position relative to the projectile so there will be substantially no relative movement during handling or during set-back forces at the time of firing or the like and which arrangement allows for smooth and reliable ejection of the sub-projectile from the projectile.

A further object of the invention is to provide a projectile and sub-projectile arrangement including non-relative movement means for maintaining the sub-projectile in a position relative to the projectile, which non-relative movement means may be inserted into the sub-projectile without significantly added construction costs and which will not hamper the ejection of the sub-projectile from the projectile.

According to the invention, a projectile and sub-projectile assembly is provided which includes a projectile defining a substantially cylindrical inner surface having an inner surface projectile diameter. The inner surface of the projectile is also provided with a groove having a groove diameter which is larger than the inner surface projectile diameter. The projectile advantageously includes an ogive front end and an ejection rear end. The ejection rear end includes an opening for inserting and ejecting a sub-projectile. A tubular member is positioned in the cylindrical chamber through the ejection end. The tubular member has an inner diameter which is preferably just slightly larger than a smaller diameter of the sub-projectile. Lock ring assembly means are provided for displaying a dimension smaller than the projectile inner diameter—for insertion of the lock ring assembly means into the chamber—and displaying a dimension substantially equal to the groove diameter to fix the lock ring assembly in the groove for retaining the tubular member in the projectile whereby the tube and lock ring assembly may be inserted through the ejection end and the sub-projectile may be inserted through the ejection end and held by the tube to prevent relative movement between the sub-projectile and the projectile during handling or prevent relative movement due to set-back forces at the time of firing.

The lock ring assembly advantageously includes first and second lock ring segments which are substantially identical and cooperate to form a partial ring. Each of the lock ring segments includes a first abutment surface. The first abutment surfaces of each of the lock ring segments being contactable to form a larger segment. A lock ring spacer includes first and second lock ring spacer abutment surfaces which, when brought into contact with second abutment surfaces of the first and second lock ring segments, cooperate with the first and second lock ring segments to form a lock ring. The lock ring assembly further includes a tube flange with outer threads engageable with inner threads of the tube. The tube flange including a flange portion adapted to cooperate with an end of the tube to sandwich the lock ring between the tube flange and the tube end to maintain the lock ring abutment surfaces in contact to maintain the lock ring in the groove.

The projectile, sub-projectile arrangement advantageously includes an expulsion charge assembly positioned at the ogive end of the projectile and a piston member positioned between the tube and the expulsion charge assembly. The piston member preferably defines a central cylindrical opening in which a take-up collar member may be positioned. The piston member preferably includes flange portions engageable with the inner surface of the projectile for sealing a rear end of the projectile cylindrical chamber from the expulsion charge assembly. The take-up collar preferably includes a central opening with a tapered portion for receiving an ogive portion of the sub-projectile. Sealing elements may be positioned adjacent the piston cylinder contact points and adjacent the take-up collar sub-projectile contact points to maintain a sealed arrangement between the expulsion charge assembly chamber and the rear end of the projectile chamber. A base plug is preferably provided at the ejection end of the projectile chamber. The base plug preferably includes exterior threads engageable with interior threads at the ejection end of the projectile body. Such threads are made to be sheared as the piston (slightly movable within the projectile chamber) and the take-up collar bear on the sub-projectile upon burning of propellant forming the expulsion charge in the expulsion chamber.

Still another object of the invention is to provide a projectile and sub-projectile arrangement which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

Figure 1:
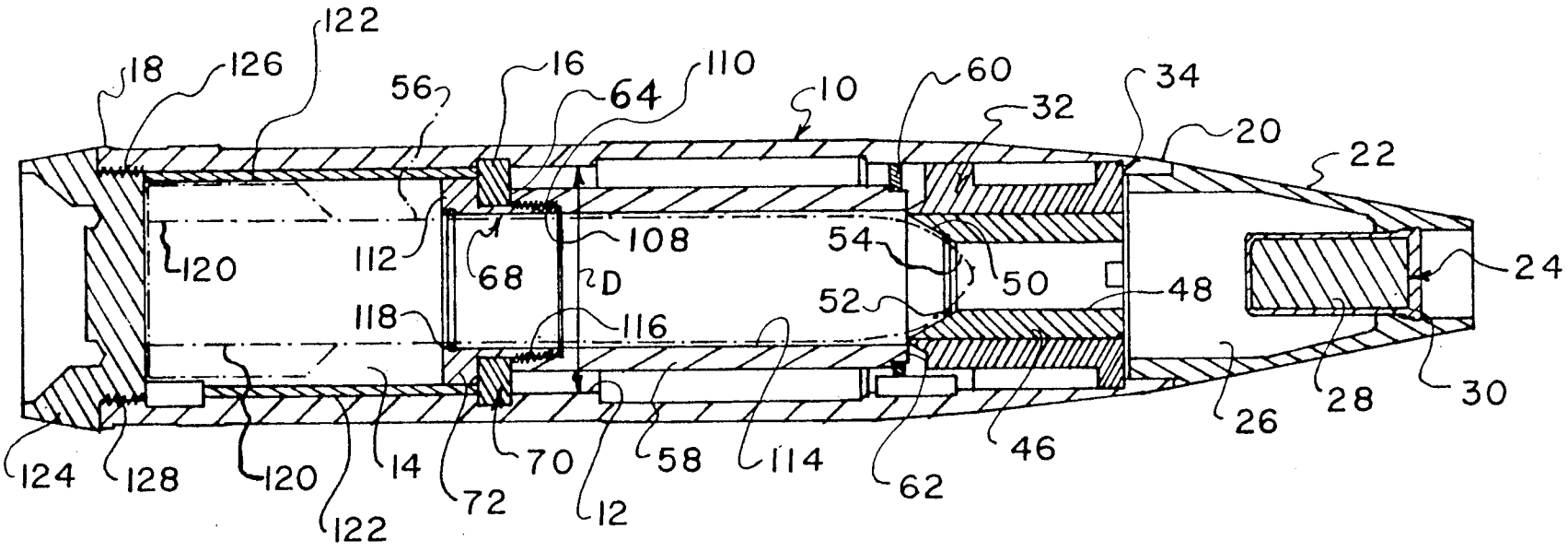
FIG. 1 is a cross-sectional view showing elements of a projectile sub-projectile assembly according to the invention.
Figure 3A:
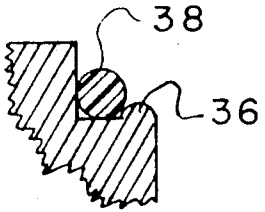
Figure 3B:
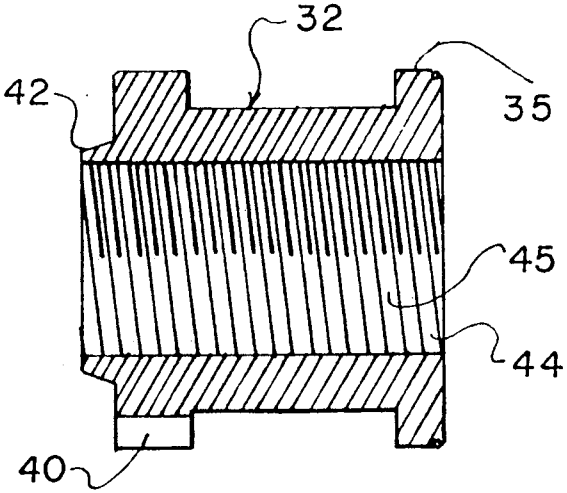
Figure 3C:
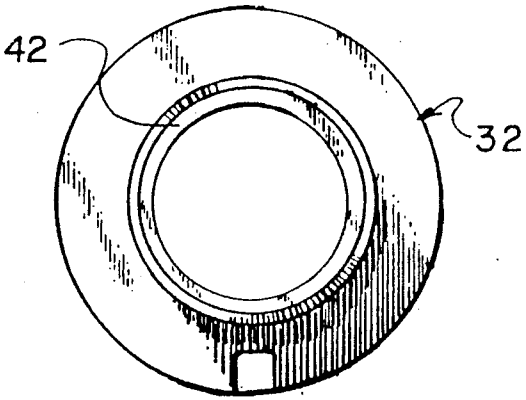

FIG. *2a* is a front view of a first lock ring segment according to the invention;

FIG. *2b* is a front view of a second lock ring segment according to the invention;

FIG. *2c* is a front view of a lock ring spacer according to the invention;

FIG. *3a* is an enlarged cross-sectional view of a portion of a projectile piston member according to the invention;

FIG. *3b* is a cross-sectional view of the projectile piston member according to the invention; and, FIG. *3c* is a front end view of the tapered portion of the piston member of FIG. *3a*.

DESCRIPTION OF THE PREFERRED EMBODIMENTS

Referring to the drawings, in particular, the invention embodied therein comprises a projectile generally designated 10 having an inner substantially cylindrical surface 12 defining a substantially cylindrical chamber 14. The inner surface 12 includes a groove portion 16 having a diameter which is larger than the diameter of the chamber 14. The projectile 10 includes an ejection end 18 and a front end 20. The front end 20 may be connected to an ogive portion 22 or the end may be formed integral with an ogive portion.

The ogive portion 22 preferably holds an expulsion charge assembly 24. Additionally, the ogive portion 22 defines an expulsion charge chamber 26. The expulsion charge assembly 24 preferably extends into the expulsion charge chamber 26. The expulsion charge assembly 24 includes an expulsion charge 28 disposed in a cup expulsion member 30. The cup expulsion member 30 is retained within the expulsion charge chamber by screw threads or other connection means.

A piston member generally designated 32 (see FIG. *3b*) is inserted into the cylinder 14 of the projectile 10, preferably through the ejection end 18. The projectile 10 inner surface 12 preferably includes a step portion 34 for preventing movement of the piston member 32 in a forward direction. As best seen in FIG. *3b*, the piston member 32 includes a piston head portion 35 with a sealing lip 36 (see FIG. *3a*). The sealing lip 36 is adapted to receive an O-ring 38 (see FIG. *3a*) which cooperates with the piston head 35 and the projectile inner surface 12 adjacent the step 34 to prevent hot gases from the expulsion chamber from passing around the outer side of the piston member 32, thereby preventing hot gases from the expulsion chamber 26 from directly entering the chamber 14. The piston member 32 is formed with a flanged support element 40 which is slotted to engage a key fitted into a keyway in the projectile inner surface 10. The flange support elements 40 maintain the piston member centered with respect to the chamber 14, such that the piston member may move axially within the chamber 14 with little or no lateral movement. The key, keyway and slotted flange prevent relative rotation of the piston 32 and projectile 10. The piston member 32 preferably includes a tapered portion 42 extending around the periphery of a rear end of the piston member 32. The tapered portion 42 provides a rear portion of the piston with a narrow diameter which gradually increases along the taper 42.

The piston 32 preferably defines a piston cylindrical opening 44 with threads 45 adapted to receive threads of a take-up collar 46. The take-up collar 46 is provided with a through-channel 48, which includes a take-up collar tapered portion 50. An O-ring 52 is provided between the take-up collar tapered portion 50 and a nose end 54 of a sub-projectile 56. A tubular member or tube 58 is positioned within the projectile chamber 14. Spacer element 60 is positioned within the chamber 14 near to the piston 32 and is provided with a slot to engage the key. The spacer element 60 may be connected to a front end of the tube 58 to prevent the tube 58 from rotating relative to projectile 10 and space the front end 62 from the inner surface 12 of the projectile body 10.

The rear end 64 of tube 58 is prevented from moving in a rearward direction and is maintained spaced from the inner surface 12 of the projectile body 10 by lock ring assembly means generally designated 68. The lock ring assembly means 68 includes a lock ring or expansion locking means generally designated 70 and a tube flange connector 72.

As best seen in FIG. *2a*, *2b* and *2c*, the locking means 70 includes a first lock ring segment 74 and a second lock ring segment 78. The first lock ring segment 74 includes a first abutting surface 80 and a second abutting surface 82. The second lock ring segment 78 includes a first abutting surface 84 and a second abutting surface 88. The first lock ring segment 74 includes an outer peripheral surface 90 and an inner peripheral surface 92. The second lock ring segment 78 includes an outer peripheral surface 94 and an inner peripheral surface 96. Each of the first and second lock ring segments are generally rectangular in cross section. The lock ring 70 also includes a lock ring spacer 98 having a first abutting surface 100 and a second abutting surface 102. The lock ring spacer 98 includes an inner peripheral surface 104 and an outer peripheral surface 106. The first lock ring segment 74, the second lock ring segment 78, and the lock ring spacer 98 are each positioned within the groove 16 such that the first abutting surface 80 and the first abutting surface 84 are in contact and such that the lock ring spacer abutting surface 100 and lock ring spacer abutting surface 102 are in contact with second abutting surfaces 82 and 88, respectively, to form the single lock ring 70. With this arrangement, the first lock ring segment 74, the second lock ring segment 78, and lock ring spacer 98 may be inserted into the chamber 14 through the ejection end 18 and positioned within the groove 16 to form a lock ring 70 with an outer peripheral surface which engages the groove 16. This may be done as each lock ring part (74,78,98)) has a largest dimension L which is smaller than the diameter D of the chamber 14.

The tube flange 72 includes an outer threaded portion 108 which engages an inner threaded portion 110 of the tube 58. The flange portion 112 of the tube flange 72 engages the lock ring 70 as the threaded portion 108 engages the threaded portion 110. In this way, the flange 112, cooperates with the tube end 64 to sandwich the lock ring 70 into a joined state preventing the first lock ring segment 74, second lock ring segment 78 and lock ringer spacer 98 from becoming disengaged. This arrangement prevents the tube 58 from moving and maintains the tube 58 in a co-axial position with respect to the projectile body 10 (the tube 58 is maintained spaced from the inner surface 12 of the projectile body 10

The tube 58 includes an inner tube surface 114 which has a diameter which is only slightly larger than the small outer diameter of the sub-projectile 56. Additionally, the tube flange 72 defines an inner cylindrical surface 116 having a diameter only slightly larger than the small, outside diameter of the sub-projectile 56. An O-ring 118 is preferably provided about the inner surface 116 of the tube flange 72 to maintain the sub-projectile 56 in position with respect to the tube flange thereby preventing relative movement and maintaining a seal between the head of the sub-projectile 56 and the rear end (large diameter end 120 of the sub-projectile 56). A sleeve member 122 may be positioned between the inner surface 12 and the tube flange 72 to provide additional support for the tube flange and to provide a lining to the chamber 14 adjacent the large diameter end of the projectile 120.

A base plug 124 is connected to the ejection end 18 of the projectile 10 by means of threaded portions 128 disposed on an outer peripheral portion 126 of the base plug 124 and a portion of the inner surface 12 adjacent the ejection end 18. The peripheral threaded portion 126 may be formed of a threaded area of 20 threads per inch or the like.

The arrangement is assembled by positioning the piston 32 and take-up collar 46 within the chamber 14 adjacent the expulsion chamber 26. The tube 58 and spacer 60 are positioned in the chamber 14 behind the piston 32. The lock ring means 70 is positioned within the chamber 14 such that the first and second lock ring segments 74 and 78 have their outer peripheral surfaces 90 and 94 engaging the groove 16 with the first abutting surfaces 80 and 84 in contact. The lock ring spacer 98 may be positioned within the chamber 14 such that the outer peripheral surface 106 engages the groove 16 and the first and second abutting surfaces 100 and 102 are in contact with second abutting surface 82 and second abutting surface 88 of the first and second lock ring segments 74 and 78 respectively. The tube flange 72 may then be inserted into the chamber 14 such that the threaded portion 108 engages the threaded portion 110, thereby sandwiching the lock ring 70 between the flange 112 and the tube end 64. The sub-projectile 56 may then be inserted within the chamber 14 such that the nose portion 54 is in contact with O-ring 52 to provide a seal between the expulsion chamber 26 and the chamber 14. The base plug 124 may then be connected to the projectile 10 by engaging the peripheral threaded portion 126 with a threaded portion 128 provided on the surface 12 adjacent the ejection end 18.

In operation, after the projectile 10 has been fired, the expulsion charge 28 of the expulsion charge assembly 24 may be burned producing hot gas under pressure which acts on the cargo ejection piston 32. The tapered portion 42 allows some movement of the piston relative to the tube 58 as the tip end of the tapered portion 42 fits within tube 58. Due to the sealing effect provided at the connection of the O-rings 38 and 52, pressure builds up in the expulsion chamber 26, such that the piston 32 and take-up collar 46 act on the reduced diameter portion of the sub-projectile which, in turn, acts on the base plug, which has been attached to the projectile by conventional screw threads 126. When the pressure has reached a sufficient magnitude to shear the screw threads 126, 128, the base plug and the sub-projectile are ejected from the projectile.

While a specific embodiment of the invention has been shown and described in detail to illustrate the application of the principles of the invention, it will be understood that the invention may be embodied otherwise without departing from such principles.

The foregoing disclosure and drawings are merely illustrative of the principles of this invention and are not to be interpreted in a limiting sense. I/We wish it to be understood that I/we do not desire to be limited to the exact details of construction shown and described because obvious modifications will occur to a person skilled in the art.

What is claimed is:

1. Apparatus for permitting a sub-projectile of a defined diameter, length, aft end and nose end, to be carried within an essentially hollow, tubular projectile having a hollow front ogive portion, a defined projectile inside diameter, length, and aft end; and further having an inside groove essentially near said aft end of the projectile, said apparatus comprising:

a piston member axially fixed in said front ogive portion, said piston member having an axial hole therein of diameter smaller than that of said sub-projectile;

a hollow tubular member of inside diameter only slightly wider than said sub-projectile diameter, and outside diameter less than said projectile's inside diameter, and length equal to the distance between said groove and the aft facing end of said piston member;

a lock ring means fixed in said groove, said lock ring means having an inside diameter about equal to the inside diameter of said tubular member, said tubular member being mounted between said lock ring means and said piston member; said sub-projectile being inserted, nose end forward, in through said aft end of said tubular projectile and into said tubular member, until it is fixed in the hole of said piston member as far as the nose end will go in, the length of said sub-projectile such that its aft end essentially meets the aft end of said projectile when so mounted;

a base plug attached to the aft end of said projectile, to hold said sub-projectile snugly with the sub-projectile front end pressed against said piston member, and held within said tubular member; and an O-ring means on said sub-projectile front end between said sub-projectile and said piston member, for cushioning the abuttment of the sub-projectile front end to said piston member.

2. The apparatus of claim 1 wherein said hollow ogive portion of said projectile further comprises an explosive means for expelling said piston member towards the projectile aft end, thereby expelling said sub-projectile and base plug out the aft end of said projectile.

* * * * *